E. B. ANDERSON.
ANIMAL TRAP.
APPLICATION FILED DEC. 14, 1911.
1,039,878.
Patented Oct. 1, 1912.
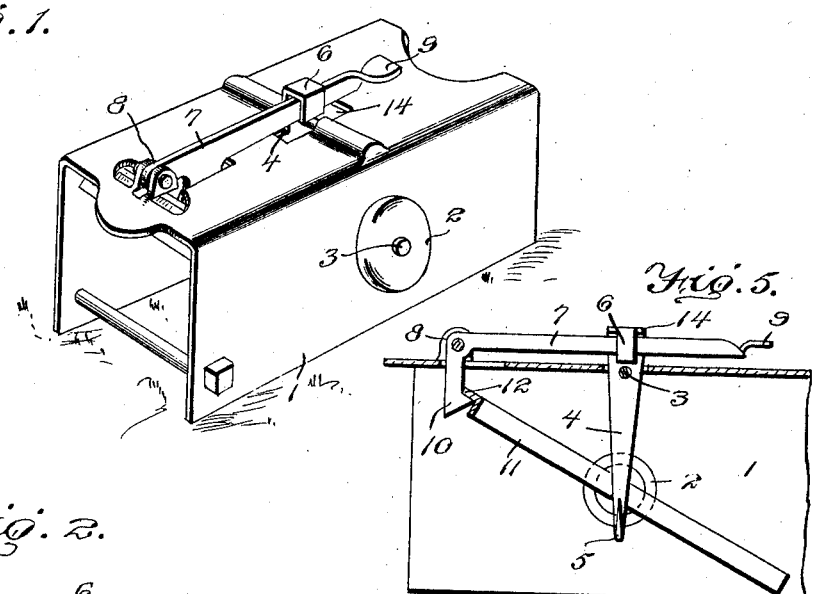
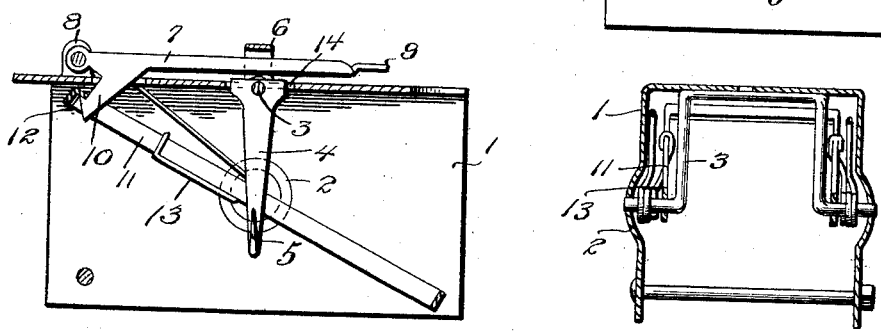
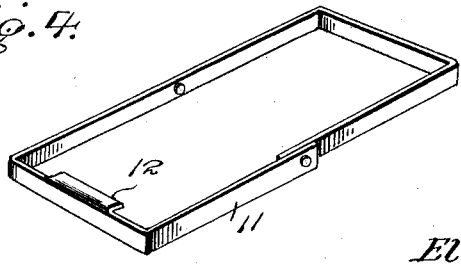
Inventor
Elias B. Anderson.
By A. B. Lacey, Attorney.

UNITED STATES PATENT OFFICE.

ELIAS B. ANDERSON, OF ROCK FALLS, ILLINOIS.

ANIMAL-TRAP.

1,039,878. Specification of Letters Patent. Patented Oct. 1, 1912.

Application filed December 14, 1911. Serial No. 665,710.

*To all whom it may concern:*

Be it known that I, ELIAS B. ANDERSON, citizen of the United States, residing at Rock Falls, in the county of Whiteside and State of Illinois, have invented certain new and useful Improvements in Animal-Traps, of which the following is a specification.

This invention relates to traps, and has for its object to provide a trap of simple structure having a trigger pivoted therein which is adapted to release the catch mechanism of the trap when the trigger is swung in either of two directions.

The trap is open at its opposite ends and therefore may be entered by an animal at either of the said ends. A striking member is pivotally mounted in the trap and is adapted to be retained with one end in an elevated position and its other end in a lowered position against the tension of a spring which engages the said member. When, however, the member is released by the catch mechanism the tension of the spring comes into play and the striking member is swung so that the animal at either end of the trap is engaged and held.

For a full understanding of the invention reference is to be had to the following description and accompanying drawing, in which:

Figure 1 is a perspective view of the trap; Fig. 2 is a longitudinal sectional view of the same; Fig. 3 is a transverse sectional view of the same with the trigger removed; Fig. 4 is a perspective view of a striking member used in the trap; Fig. 5 is a side elevation of a modified form of part of the trap.

Corresponding and like parts are referred to in the following description and indicated in all the views of the accompanying drawing by the same reference characters.

The trap consists of a body or casing 1 which is open at its opposite ends and which is provided in its sides with outwardly disposed portions 2. A rod 3 is bowed at its intermediate portion and its ends are passed through the sides of the body 1 at the centers of the portions 2 thereof. The intermediate portion of the rod 3 lies in a crease struck up in the top of the body 1, as best shown in Fig. 1. A bait hook 4 is pivoted upon the upper intermediate portion of the rod 3 and is provided at its lower portion with a bill 5 upon which the bait is to be impaled. The hook 4 is provided at its upper end with an eye 6 which receives the free end portion of a catch bar 7. The bar 7 is pivoted to the top of the casing 1 in the vicinity of the forward end thereof between two lugs 8 which are formed up from the material at the top of the said body.

The parts of the trap are preferably made from sheet metal and the bar 7 is provided at its rear end with a thumb plate 9 which may be pressed in a downward direction when it is desired to set the trap. The bar 7 is provided in the vicinity of that end which is pivoted to the body 1 with a hook 10. A striking member 11 is pivoted at a point midway between its ends upon the end portions of the rod 3. This member is approximately rectangular in plan and is provided at its forward end with a lug 12 which is adapted to be engaged by the hook 10 upon the bar 7. Coil springs 13 bear at one end against the top of the body 1 and pass around the end portions of the rod 3 and at their other ends engage the said striking member. The coils of the springs are partially received within the outwardly disposed portions 2 of the body 1. The tension of these springs is such that they have a tendency to swing that end of the striking member 11 which is under the hook 10 in a downward direction when the said member is released by the said hook. The hook 4 is provided just below the eye 6 with two shoulders 14 which lie directly under the lower edge of the bar 7. Therefore when the trap is baited and the striking member 11 is set and held by the bar 7 and its hook 10, an animal may enter the body 1 at either end thereof and by pushing or pulling the lower end of the hook 4 the said hook is swung upon its pivot so that one or the other of the shoulders 14 thereof will encounter the under edge of the bar 7 and swing the free end portion thereof in an upward direction. This movement on the part of the bar 7 will carry the hook 10 from under the lug 12 and consequently the tension of the springs 13 comes into play and the striking member 11 is swung so that the animal is engaged and held. If the animal enters one end of the body 1 it will receive the blow from above, but if it enters the other end of the body the blow is delivered from below.

In the form of the device as illustrated in Fig. 5 of the drawing, the same features are shown as illustrated in Fig. 2, with the exception that the bar 7 is arranged to release the striking member 11 when it is swung in a downward direction instead of in an upward direction, as is the case in the arrangement shown in Fig. 2. In this form of the invention the bar 7 extends through the eye 6 and the shoulders 14 are located adjacent the upper edge of the bar 7 instead of adjacent the lower edge as is the case in the form of the trap as shown in Fig. 2.

Having thus described the invention, what is claimed as new is:

1. A trap comprising a body, a hook pivotally supported at the upper portion thereof and having at its upper edge an eye, a striking member pivoted in the body, a spring engaging said striking member and adapted to force one end thereof in a downward direction, a bar pivoted upon the body and having a free end portion passing through the eye upon said hook, said bar in turn being provided with a hook adapted to engage the striking member.

2. A trap comprising a body, a hook pivotally supported at the upper portion thereof and provided at its upper end with an eye and having shoulders located at the sides of the eye, a striking member pivoted in the body, a spring engaging the striking member and adapted to force one end thereof in a downward direction, and a bar pivoted upon the body and having a free end portion passing through the eye and adapted to be engaged by the shoulders upon the hook, said bar having a hook adapted to engage the striking member.

In testimony whereof I affix my signature in presence of two witnesses.

ELIAS B. ANDERSON. [L. S.]

Witnesses:
HARLAN L. BREWER,
JOHN F. SHAW.

---

Copies of this patent may be obtained for five cents each, by addressing the "Commissioner of Patents, Washington, D. C."